(12) United States Patent
Birman et al.

(10) Patent No.: US 7,506,996 B2
(45) Date of Patent: Mar. 24, 2009

(54) ILLUMINATED DISPLAY HAVING TWO SINGLE-COLORED LIGHT SOURCES

(75) Inventors: Vyacheslav B. Birman, Rochester Hills, MI (US); Christian Tanguy, Sterling Heights, MI (US); Werner Eckardt, Rochester, MI (US); Shirley Yu, Troy, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 441 days.

(21) Appl. No.: 11/030,377

(22) Filed: Jan. 6, 2005

(65) Prior Publication Data

US 2005/0162090 A1  Jul. 28, 2005

Related U.S. Application Data

(60) Provisional application No. 60/538,489, filed on Jan. 22, 2004.

(51) Int. Cl.
F21V 7/00 (2006.01)
(52) U.S. Cl. .............. 362/236; 362/231; 362/241; 362/240; 362/235; 362/230
(58) Field of Classification Search ......... 362/230–231, 362/235–237, 240–241, 243, 246–247, 800
See application file for complete search history.

(56) References Cited

U.S. PATENT DOCUMENTS

| | | | |
|---|---|---|---|
| 3,873,979 A | | 3/1975 | Craford et al. |
| 3,875,456 A | * | 4/1975 | Kano et al. .................. 313/501 |
| 4,845,481 A | | 7/1989 | Havel et al. |
| 5,047,761 A | | 9/1991 | Sell et al. |
| 5,975,728 A | | 11/1999 | Weyer |
| 6,132,072 A | * | 10/2000 | Turnbull et al. ............. 362/494 |
| 6,234,648 B1 | * | 5/2001 | Borner et al. ............... 362/235 |
| 6,238,076 B1 | | 5/2001 | Pascale |
| 6,239,776 B1 | | 5/2001 | Havel |
| 6,357,889 B1 | * | 3/2002 | Duggal et al. ................. 362/84 |
| 6,550,953 B1 | | 4/2003 | Ichikawa et al. |
| 6,717,376 B2 | | 4/2004 | Lys |
| 7,118,261 B2 | * | 10/2006 | Fredericks et al. .......... 362/545 |
| 2003/0147242 A1 | * | 8/2003 | Stopa ........................ 362/231 |

(Continued)

FOREIGN PATENT DOCUMENTS

DE  102 01 053 A1  8/2002

(Continued)

OTHER PUBLICATIONS

"Press Releases: Ford Takes Licence for Instrumental Panel Patent for Ford Mustang," www.loveinventor.com, Mar. 10, 2005, Beverly Hills, CA.

(Continued)

Primary Examiner—Jong-Suk (James) Lee
Assistant Examiner—Robert May

(57) ABSTRACT

A vehicle display includes two colored light sources that are operatively connected to a circuit board. Each of the two colored light sources emits a colored light that mixes to form a desired color of display light that illuminates a vehicle graphic. The desired color of display light is within a predetermined color tolerance. The vehicle display achieves a small size without incurring added expenses associated with using more than two light sources.

1 Claim, 2 Drawing Sheets

U.S. PATENT DOCUMENTS

2003/0156425 A1    8/2003    Turnbull
2005/0099808 A1*   5/2005    Cheng et al. ................ 362/231

FOREIGN PATENT DOCUMENTS

EP          0 405 286      1/1991
GB          2 158 631      11/1985

OTHER PUBLICATIONS

Dennis Crouch, Patently-O: Patent Law Blog, "Ford Settles Patent Lawsuit," www.patentlaw.typepad.com, Mar. 21, 2005.
*Frank M. Weyer* v. *Ford Motor Company*, Civil Action No. 04-08630, "Complaint for Patent Infringement Demand for Jury Trial." Oct. 19, 2004.
International Search Report, Nov. 30, 2005.

* cited by examiner

ILLUMINATED DISPLAY HAVING TWO SINGLE-COLORED LIGHT SOURCES

CROSS-REFERENCE TO RELATED APPLICATIONS

The application claims priority to U.S. Provisional Application No. 60/538,489, filed on Jan. 22, 2004.

BACKGROUND OF THE INVENTION

This invention relates to vehicle displays and, more particularly, to a vehicle display that utilizes two light sources to illuminate the vehicle display with a color that is within a predetermined color tolerance.

Modern vehicles typically include numerous illuminated displays in the vehicle interior such as on the instrument cluster, for example, that communicate information to a driver. Typically, an original equipment manufacturer (OEM) specifies particular colors of the various displays. Often the specified color is characteristic of the OEM such that it distinguishes the vehicle of the OEM from vehicles of other OEMs.

Typically, the lighted vehicle displays utilize a light bulb that generates the specified color. A colored light bulb, for example, may be positioned behind the vehicle display to illuminate the vehicle display with the specified color. Alternatively, a white light bulb and a color filter may be used to generate the specified color.

Light bulbs may present numerous problems when used in vehicle displays. Light bulbs are relatively large in size and therefore require a significant amount of space in the vehicle display. Light bulbs also periodically burn out and require maintenance to replace the light bulb. Colored light bulbs are also limited in that the colored light emitted is not variable and the vehicle display therefore may only be illuminated with a single color emitted by the colored light bulb. This limits the ability of a supplier to achieve the exact color specified by an OEM. Additionally, for vehicle displays that utilize a light filter, the light filter often muffles the intensity and brightness of the vehicle display and may make the vehicle display difficult to see for the driver or passenger.

Other conventional vehicle displays utilize at least three light sources, such as a red, green, and blue light source to generate the specified color or colors required by an OEM. One drawback of using three light sources is that the three light sources may require a significant amount of space in the vehicle display, making the vehicle display bulky in size. Additionally, more light sources increase the number of components and add to the expense of the vehicle display.

More compact and less expensive vehicle displays are desirable.

SUMMARY OF THE INVENTION

An exemplary vehicle display includes two colored light sources that are operatively connected to a circuit board. Each of the two colored light sources emits a colored light that mixes to form a desired colored display light that illuminates a vehicle graphic. The desired colored display light is within a predetermined color tolerance.

In one example, an original equipment manufacturer (OEM) specifies a target color in terms of unitless X and Y color coordinates. The target color distinguishes the vehicle from other vehicles that are manufactured by other OEMs. The predetermined color tolerance around the target color is ±0.05 for each of the unitless X and Y color coordinates and light from the two colored light sources mixes to produce the desired colored display light within the ±0.05 predetermined color tolerance.

In another example, the predetermined color tolerance around the target color is ±0.02 for each of the unitless X and Y color coordinates and light from the two colored light sources mixes to produce the desired colored display light within the ±0.02 predetermined color tolerance.

In another example, the vehicle display includes a diffuser between the two colored light sources and the vehicle graphic. The diffuser scatters and mixes the colored light emitted from the two colored light sources.

In another example, a housing of the display includes an inclined reflective surface that extends over the two colored light sources. The inclined reflective surface reflects the colored light from the two colored light sources onto angled surfaces in the vehicle display. The angled surfaces reflect the colored light from the inclined reflective surface to mix the colored light and provide the desired colored display light that illuminates the graphic.

The exemplary compact vehicle displays utilize two colored light sources to illuminate a vehicle graphic and achieve a small size without incurring added expenses associated with using more than two light sources.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
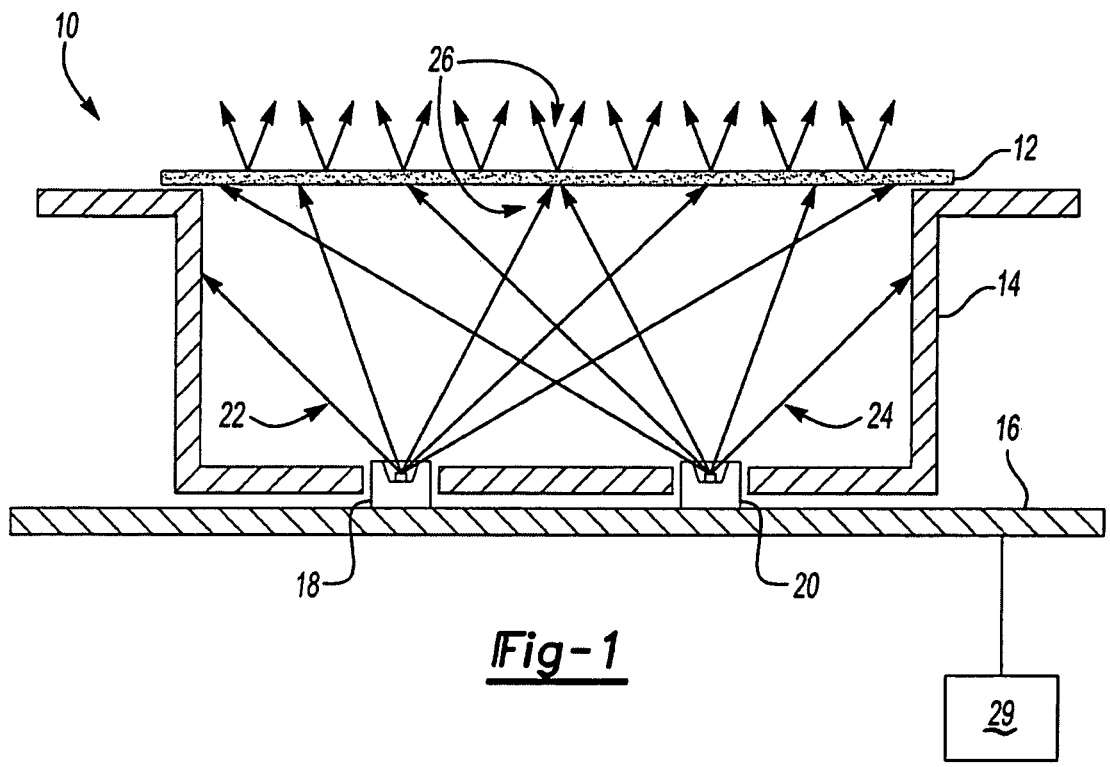
FIG. 1 is a schematic cross-sectional view of an example vehicle display.

FIG. 1 is a schematic cross-sectional view of an example display 10. This example is useful in a vehicle instrument cluster, heating-ventilating-air-conditioning control, or radio in a motorized vehicle, for example. The display 10 includes a graphic 12, such as a letter, picture, or other graphic that communicates information to a driver or passenger of the vehicle. In other examples, the display 10 may include multiple, spaced-apart graphics 12.

A housing 14 supports the graphic 12. The housing 14 is associated with a circuit board 16. Two single-colored light sources 18, 20 are operatively connected to the circuit board 16 and emit light into the housing 14. The light sources 18, 20 each produce a different color light compared to each other.

In one example, the two colored light sources 18, 20 are light emitting diodes (LEDs) that each emits a colored light 22, 24. The colored light 22 of the colored light source 18 is different than the colored light 24 of the other colored light source 20. The colored lights 22, 24 mix in the housing 14 to produce a desired color of light 26. The desired color of light 26 illuminates the vehicle graphic 12.

A controller 29 controls the two colored light sources 18, 20. In one example, the controller 29 selectively controls an intensity of each of the two colored light sources 18, 20. The controller 29 changes the intensities of the two colored light sources 18, 20 to illuminate the vehicle graphic 12 with one of at least three different desired colors using known techniques. That is, the controller 29 intensifies one of the two colored light sources 18 relative to the other to produce a first color; intensifies the other of the two colored light sources 20 to produce a second color; and intensifies the two colored light sources 18, 20 equally to produce a third color. The choice of intensities depends on the colors of the light sources and the desired color of light 26 using known color relationships and known control techniques.

Figure 2:
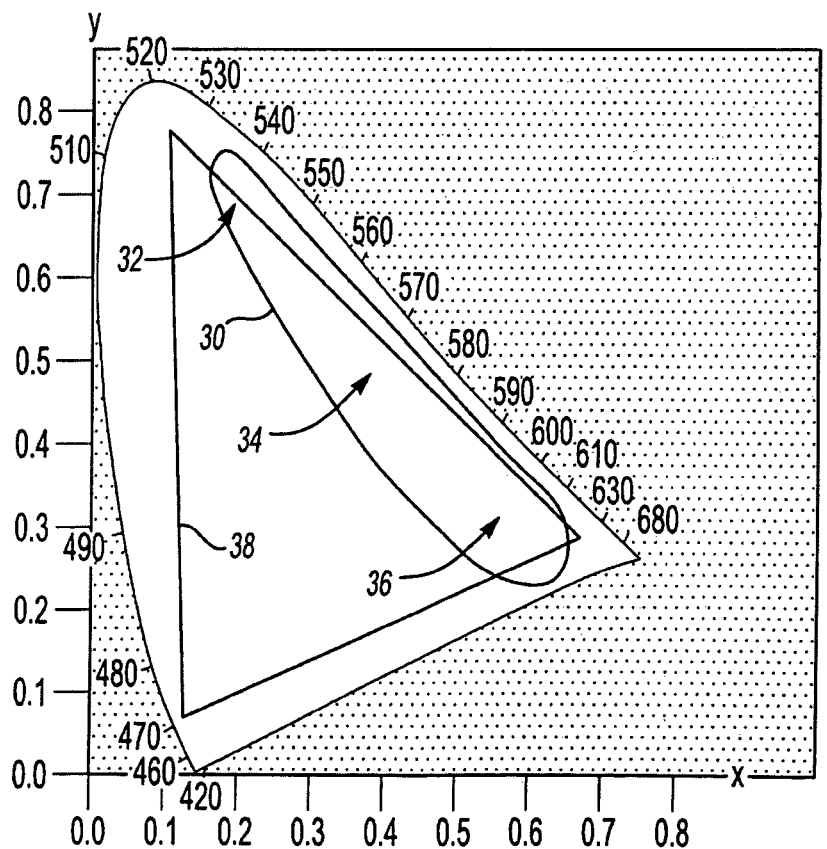
FIG. 2 illustrates one example of a range of colors that the two colored light sources can generate.

FIG. 2 illustrates one example color range 30 of a plurality of potentially desired colors that the two colored light sources 18, 20 can generate. The color range 30 is depicted on a known C.I.E. 1931 chromaticity diagram and includes green portions 32, yellow portions 34, and red portions 36. The color range 30 is narrower than a range 38, for example, of a known three light system (e.g. a combination of red, green, and blue light sources). The example display 10 functionally requires only a few desired colors, for example green, yellow, or red, which are included in the range 30. Therefore, using the two colored light sources 18, 20 to generate the desired color of light 26 from within the color range 30 does not detract from the functionality of the vehicle display 10. Selecting a more narrow color spectrum and only two light sources to realize colors within that spectrum reduces the amount of components and provides cost savings compared to arrangements relying on three or more light sources.

In one example, the controller 29 controls the two colored light sources 18, 20 with selected intensities such that the light emitted by the two colored light sources 18, 20 mixes to produce a color corresponding to the desired color within a predetermined color tolerance. As is known, the C.I.E. 1931 chromaticity diagram and known transformations of such diagrams provide graphical and mathematical representations of color as perceived by a standard observer having a two-degree field of observation. The desired color of light 26 may therefore be expressed as unitless X and Y color coordinates in accordance with the C.I.E. 1931 chromaticity diagram.

In one example, an original equipment manufacturer (OEM) specifies a target or desired color, which is expressed in terms unitless of X and Y color coordinates. The target color corresponds to the original equipment manufacturer (OEM) of a vehicle in which the display 10 operates. The target color may be unique to an OEM to distinguish a vehicle from other vehicles that are manufactured by other OEMs.

The predetermined color tolerance around the target color is ±0.05 for each of the X and Y color coordinates. That is, the unitless X color coordinate of the desired color of light 26 is within ±0.05 of the unitless X color coordinate of the target color and the Y color coordinate of the desired color of light 26 is within ±0.05 of the unitless Y coordinate of the target color. In one example, an average individual will detect little or no color variation between the illuminated color and the desired color light when a ±0.05 tolerance is achieved.

Light from the two colored light sources 18, 20 mixes in the housing 14 to produce the desired color of light 26 within the ±0.05 predetermined color tolerance, and therefore may provide the benefit of meeting the vehicle display 10 color requirements of the OEM without incurring added size and expense associated with using three or more light sources. Moreover, such tight tolerances are not possible with known displays using three or more light sources.

In another example, the target light specification is even more stringent and is within ±0.02 for each of the unitless X and Y color coordinates. That is, an X color coordinate and Y color coordinate of the desired color of light 26 are each within ±0.02 of the unitless X color coordinate and unitless Y color coordinate of the target color. In one example, an average individual will not detect a color variation between the illuminated color of the graphic 12 and the desired color of light 26 when using a ±0.02 tolerance.

Figure 3:
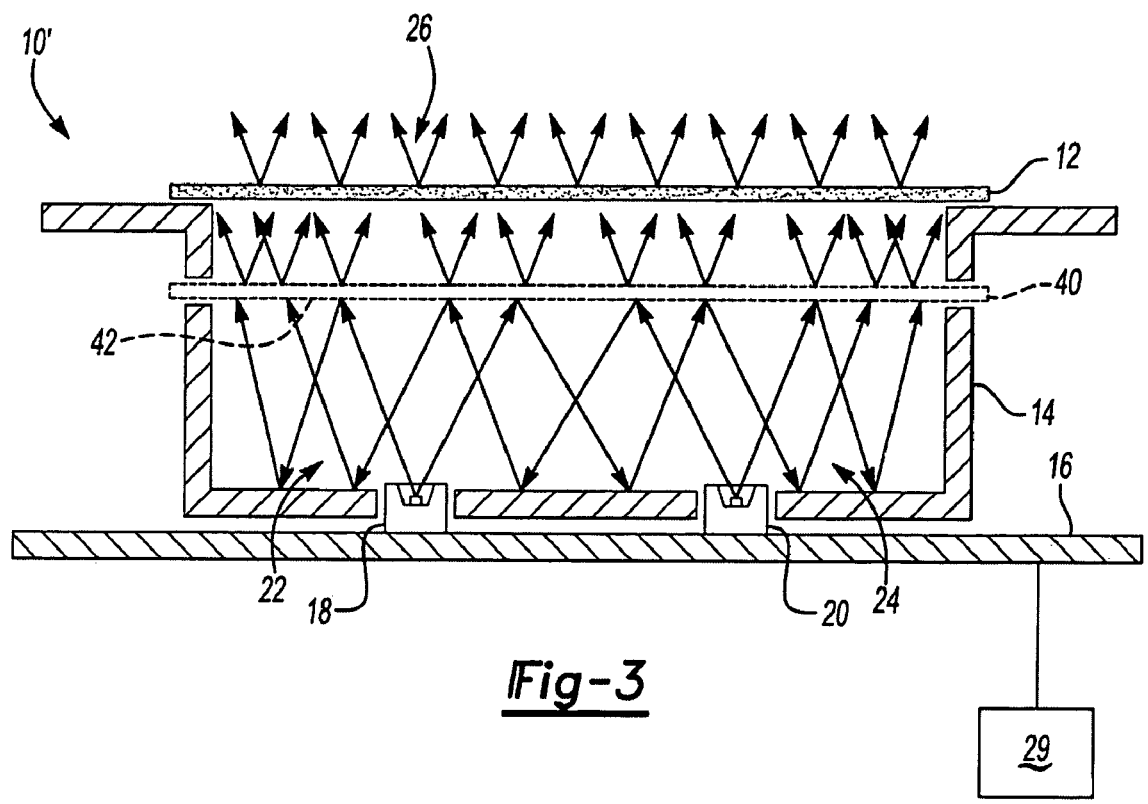
FIG. 3 is a schematic cross-sectional view of another example vehicle display including a diffuser.

FIG. 3 is another example display 10'. The display 10' includes a diffuser 40, such as a translucent layer of plastic material, between the two colored light sources 18, 20 and the graphic 12. The diffuser 40 scatters and mixes the colored light 22, 24 emitted from the two colored light sources 18, 20.

In one example, the diffuser 40 reflects at least some of the colored light 22, 24 off of an interior surface 42 towards the two colored light sources 18, 20 and transmits colored light 22, 24 to produce desired color of light 26 for illuminating the graphic 12. Although the colored light 22, 24 may mix without using the diffuser 40, the diffuser 40 may advantageously provide more even distribution of the desired color of light 26.

Figure 4:
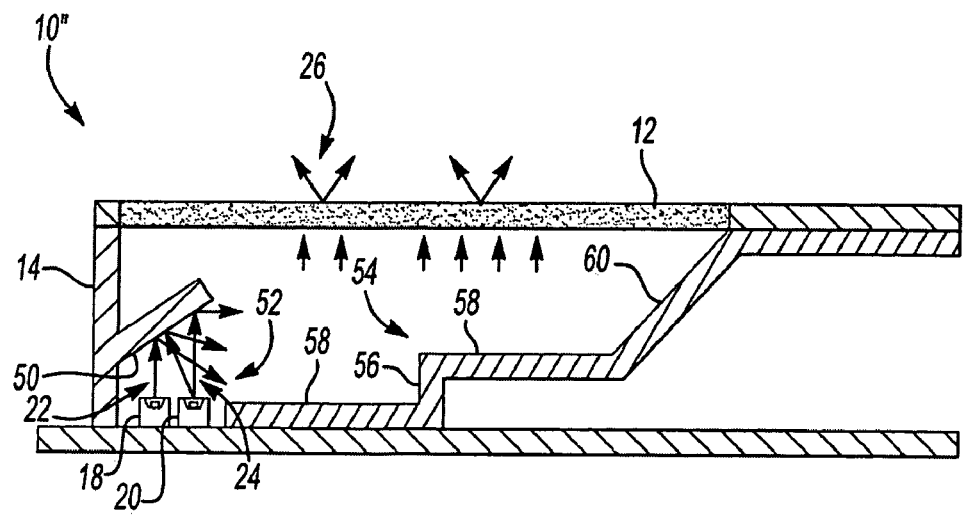
FIG. 4 is a schematic cross-sectional view of another example vehicle display, including an inclined reflective surface.

FIG. 4 illustrates another example display 10". The housing 14 of the display 10" includes an inclined reflective surface 50 that extends directly over the two colored light sources 18, 20. The inclined reflective surface 50 reflects the colored light 22, 24 from the two colored light sources toward a channel 52.

The channel 52 distributes the reflected colored light 22, 24 over an area 54 that includes perpendicular surfaces 56, 58 and an angled surface 60. The reflected colored light 22, 24 from the inclined reflective surface 50 reflects off of the perpendicular surfaces 56, 58 and angled surface 60. Reflecting the colored light 22, 24 in the housing 14 mixes the colored light 22, 24 to produce the desired color of light 26, which illuminates the graphic 12.

The exemplary compact displays 10 utilize two colored light sources 18, 20 to illuminate the graphic 12 and achieve a small size without incurring added expenses associated with using more than two light sources.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A display comprising:
    a display that shows a desired color of light;
    two single-colored light sources selected to produce light corresponding to said desired color of light when light from only said two single-colored light sources mix, wherein said two single-colored light sources produce said light within a predetermined color tolerance of said desired color of light; and
    a housing that directs said light from said two light sources onto a portion of the display comprising a vehicle graphic, said housing including a first angled extension extending over said two colored light sources, said first angled extension including a reflective surface facing said two colored light sources for mixing light from said two colored light sources, said housing further including a second angled extension oriented to reflect said light from said first angled extension.

* * * * *